UNITED STATES PATENT OFFICE.

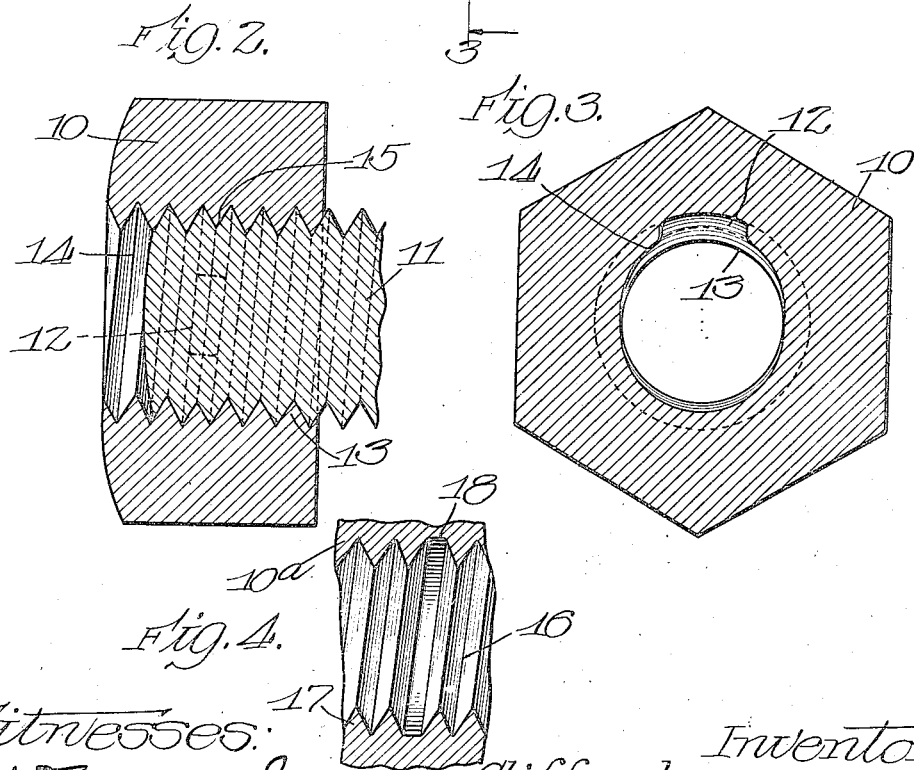

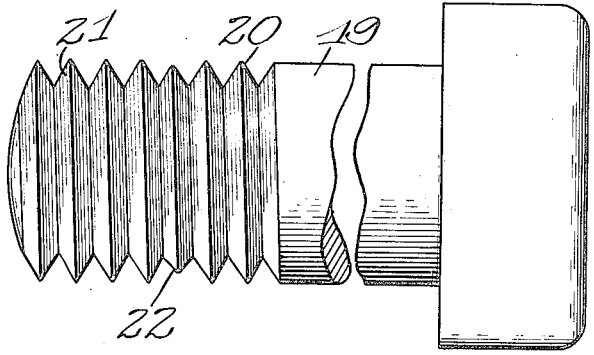
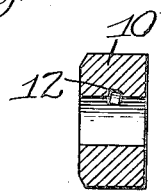
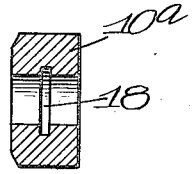
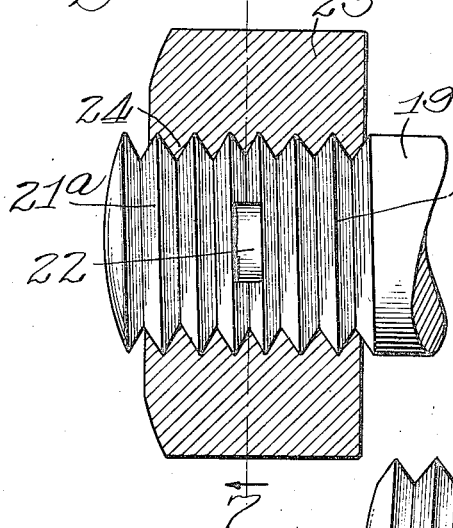
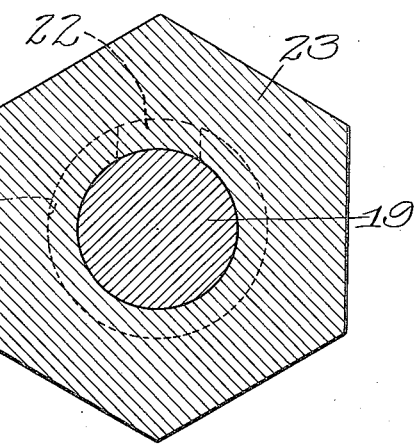
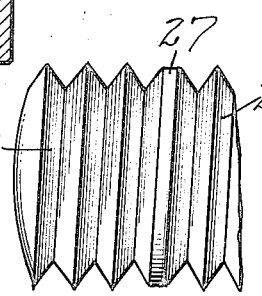

CLIFFORD P. MARYE, OF SOUTH WHITLEY, INDIANA, ASSIGNOR OF ONE-THIRD TO WILLIAM A. ROSENBAUM, TRUSTEE, OF NEW ROCHELLE, NEW YORK.

NUT AND BOLT LOCK.

1,210,507. Specification of Letters Patent. Patented Jan. 2, 1917.

Application filed March 24, 1913, Serial No. 756,282. Renewed May 25, 1916. Serial No. 99,917.

*To all whom it may concern:*

Be it known that I, CLIFFORD P. MARYE, a citizen of the United States, residing at South Whitley, in the county of Whitley and State of Indiana, have invented certain new and useful Improvements in Nut and Bolt Locks, of which the following is a specification.

This invention relates to improvements in nut and bolt locks of the type in which the nut and bolt are locked together by the frictional engagement of the threads of the coöperating elements, so as to prevent unintentional relative movement, and the primary object of the invention is to provide an improved device of this class in which the threaded portion of one of the elements is tapped or cut from opposite points lengthwise of the element and in such a manner that the threads will, as the result of the thread cutting operation, be normally arranged preferably in co-axial sections, so disposed that one of the sections of threads which extends from one point of the element will be normally out of helical alinement with the other section of similar threads extending from another point of the element and toward the first said section of threads, while the thread of the other element is continuous and uniform throughout its length, thereby producing a device having a maximum frictional gripping contact between the threaded surfaces of the nut and the coöperating bolt, and which gripping contact is produced by such an arrangement of the threads.

To the attainment of these ends and the accomplishment of other new and useful objects as will appear, the invention consists in the features of novelty, in substantially the construction, combination and arrangement of the several parts hereinafter more fully described and claimed and shown in the accompanying drawing exemplifying the invention and in which—

Figure 1 is a longitudinal sectional view of an improved nut of this class constructed in accordance with the principles of this invention. Fig. 2 is a sectional view taken on line 2—2, Fig. 1. Fig. 3 is a sectional view taken on line 3—3, Fig. 1. Fig. 4 is a detail sectional view of a modification. Fig. 5 is a view in elevation and partly broken away, of a bolt constructed in accordance with the principles of this invention. Fig. 6 is a view partly in elevation and partly in section of another form of bolt, constructed in accordance with the principles of this invention and having a nut provided with a uniform thread, applied thereto. Fig. 7 is a view taken on line 7—7, Fig. 6. Fig. 8 is a detail view in elevation of still another modified form of bolt. Fig. 9 is a sectional view of a nut blank showing one position of the recess, if the recess is employed. Fig. 10 is a sectional view of a nut blank showing another form of recess or groove, if a recess or groove is employed.

In the drawing and in Figs. 1 to 3 and 9 the nut designated generally by the reference numeral 10 may be of any usual or preferred shape, a hexagonal nut being shown for the purpose of illustration, the thread being of any standard shape, to coöperate with the thread of the bolt 11, and the thread of the latter is also of any standard shape throughout its length. The nut 10 is an ordinary solid nut and is first formed in blank in any usual or desired manner. After the nut blank has been formed, a recess 12 having a closed bottom, may be formed therein at any desired point intermediate the faces of the nut. This recess is arranged so as to communicate with the opening in the nut, and the recess is of any desired depth but is preferably shallow so as not to weaken the nut. The blank is then threaded so as to form two sections of threads 13—14, which sections of threads, in the form of the invention shown in Figs. 1 and 2 are of the same pitch and terminate adjacent each other. One of the sections of threads is offset with respect to the other section of threads in a direction lengthwise of the nut and to an extent less than the thickness of one thread, so that at the point where the inner end of the thread in one section meets the inner end of the thread in the succeeding section, the two ends, if they overlap, will create a slight thickening or thinning of the overlapping portions, as shown at 15, Fig. 2, depending upon whether the sections are offset away from or toward each other. The recess 12 may be omitted if desired, but when employed is arranged so that it will be disposed adjacent the point where the proximate ends of the threads terminate, and one of the objects of this recess is for the purpose of separating the two contiguous ends of the sections of threads. With this improved construction and with the threads thus cut into the nut it will be manifest that the sections of threads are not in helical alinement but are arranged out of register or helical alinement with respect to each other.

In use the nut is applied to the bolt 11 in the ordinary manner and as the threads of the bolt which coöperate with this form of nut are uniform and continuous, the nut may be readily applied to the bolt as long as only one of the thread sections is in engagement with the threads of the bolt. When the extremity of the thread on the bolt engages the other section of the threads in the nut, the coöperating threads of the nut and bolt will operate upon each other in a manner to force the threads in the nut into helical alinement. That is to say, the threads on the nut or on the bolt, whichever is of a harder construction, will deflect the other threads sufficiently to cause the sections of threads to be brought into helical alinement, and this deflection of the threads will result in a frictional gripping action between the threads of the bolt and the nut, thereby locking the two against accidental relative movement. When it is desired to remove the nut, it can be accomplished in the ordinary manner, that is, by unscrewing the nut with relation to the bolt, the threads being of such a construction that they will readily yield under force, and will assume their normal position and out of helical alinement by the operation of the removal of the nut.

The threads of the nut are of such a construction that although they are flexible or ductile, they should be so arranged and cut that by the operation of applying and removing the nut from the bolt, they will not be deflected beyond the point of their flexibility to such an extent that they will become set so that they would not move back to their normal positions upon the removal of the nut. This will permit the nut to be again used and will produce the same gripping effect with the bolt when it is used over again any number of times after having been removed.

In the form of the invention shown in Figs. 4 and 10, the thread sections 16 and 17 in the nut 10ᵃ are cut into the nut in any suitable manner so that they will be arranged in co-axial sections and so that the sections of threads will be normally out of helical alinement, but the two sections of threads terminate some distance short of each other thereby causing the thread sections to be spaced from each other lengthwise of the nut with the result that an unthreaded portion or space 18 will be formed adjacent the proximate inner ends of the sections. This space 18 is formed in the blank before the latter is threaded, so as to separate the threads, and is arranged in such a manner that the proximate extremities of the thread sections will terminate adjacent the space. With this form of the invention, the space 18 may be of any desired size but is of sufficient size that the action of the bolt threads upon the non-helically alined sections of nut threads will be to separate the latter or draw them together according to the size and shape of the space and the method of cutting of the thread sections, and this forcing of the thread sections of the nut, will result in a frictional gripping action between the coöperating threads of the nut and bolt.

In Fig. 9 the nut blank 10 is shown with the recess 12 cut therein and prepared for the threading or tapping operation, the formation of the recess 12, if employed being the first step of the operation, after the blank has been formed.

In Fig. 10 the nut blank 10ᵃ is shown with the recess 18 formed therein, which is done prior to the threading operation.

In Fig. 5 there is shown a bolt 19 having its thread similarly arranged. The thread on the bolt 19 is arranged in two sections 20—21, and these two sections of thread are of a uniform pitch and are spaced from each other in a direction longitudinally of the bolt so that the thread sections while being coaxial will be disposed out of helical alinement, so that when a nut having a uniform and continuous thread therein, is applied to the bolt and the thread of the nut has simultaneous engagement with the two sections of threads on the bolt, the latter will be forced into helical alinement.

In Fig. 6 the bolt 19ᵃ is provided with similar thread sections 20ᵃ—21ᵃ and a recess 22 is formed in the bolt between the proximate ends of the thread sections. This recess 22, if employed, is formed in the bolt prior to the threading operation and may be of any desired size but is such that it will not weaken the bolt and extends only partially therearound.

With the forms of bolt shown in Figs. 5 and 6, the nut 23 used in connection therewith is provided with a thread 24 which is continuous and uniform throughout its length so that when the nut is applied to the bolt and the thread 24 of the nut has simultaneous engagement with the two sections of threads on the bolt, the thread of the nut will tend to force the bolt thread sections into helical alinement. The operation of this form of the invention is the same as that shown in Figs. 1 to 3 with the exception that in the latter figures the sections of thread are shown as being arranged within the nut, while the thread upon the bolt which coöperates therewith is of a uniform size and pitch and continuous. In the form of the invention shown in Figs. 5 and 6, however, the thread of the coöperating nut is continuous while the thread of the bolt is arranged in sections out of helical alinement.

In Fig. 8 the bolt is provided with two co-axial sections of threads 25—26 which are of a uniform size and pitch and are arranged out of helical alinement and so as to form an unthreaded space 27 between the proximate ends of the thread sections, and which unthreaded space extends completely around the bolt. With this form of the invention a nut similar to the nut 23 is employed, that is, a nut having a continuous and uniform thread therethrough. The recess 12 in the nut, if employed, may be of any desired size and length but is of a size that the nut will not be weakened thereby, and the threads are so constructed or cut into the nut that as a result of the threading or tapping operation the two sections of threads will be co-axial but normally out of helical alinement, thereby obviating the necessity of any distortion or twisting of the body of the nut or bolt to produce the non-helical alinement of the thread sections.

The sections of threads in the nut or on the bolt, whichever form of the invention is employed, may be of any length, when considered in the direction lengthwise of the element, so that their proximate ends may be at any point lengthwise of the element according to the length of the respective sections of threads it is desired to produce. In all of the forms of the invention, however, a maximum gripping surface between the threads is obtained and with these constructions, as has been stated, there will be no mutilation of the threads, which mutilation would render one or both of the elements useless after the nut has been once removed from the bolt.

Since the threads of the nut or bolt element herein described are formed in a solid body, there can be no bodily movement of the thread sections with respect to each other when the device is in action. The only movement of the threads that takes place is that due to the springing or yielding of the individual threads as described, the extent of which depends upon the extent to which the sections are originally offset with respect to each other. From this it follows that the self-locking or retaining power of the device can be accurately and uniformly predetermined by no other provision than the offsetting of the thread sections with respect to each other to a given amount. The two offset sections of thread immediately succeed each other either directly, by the end of one joining the beginning of the other, or indirectly through an intervening space such as might be afforded by the groove 12, so that the retaining friction will be due solely to the offsetting of the sections and will not be modified by any third section of thread intervening between them.

What is claimed as new is:—

1. The herein described nut and bolt lock element having a non-spring body provided with a plurality of successive threaded sections, the threads of each of said sections being of uniform pitch throughout, and the pitch of the sections being the same, the said sections being so arranged that the thread of one section will be normally out of helical alinement with those of the next succeeding section.

2. The combination of a threaded bolt and a nut coöperating therewith, both of which have a non-spring body, one of the elements having a rotatively non-distorted body and being provided with a plurality of thread sections, the threads of each section being of uniform pitch throughout, the said sections being contiguous and so arranged with respect to each other that they will be normally out of helical alinement, and the other element being provided with a continuous thread of a size and pitch uniform with the said thread sections and adapted to simultaneously engage the thread sections.

3. The combination of a threaded bolt and a nut coöperating therewith, both of which have a non-spring body, one of the elements being provided with a plurality of immediately successive thread sections, the threads of each section being of uniform pitch throughout, the said sections being so arranged with respect to each other that they will be normally out of helical alinement, there being a non-threaded space between the proximate ends of the thread sections, and the other element being provided with a continuous thread of a size and pitch uniform with the said thread sections and adapted to simultaneously engage the thread sections.

4. The herein described lock nut having a solid non-spring threaded body, the thread being cut in such a manner as to form two immediately successive sections of threads extending in directions from opposite faces of the nut toward each other, and so that the thread sections will be normally out of helical alinement, the threads of each section being of the same uniform pitch.

5. The herein described nut and bolt lock element having a non-spring body provided with a plurality of co-axial thread sections, the threads of each of said sections being of uniform pitch throughout, and the pitch of the sections being the same, the said sections immediately succeeding each other and being so arranged that the threads of the sections will be normally out of helical alinement with respect to each other.

6. The combination of a threaded bolt and a nut coöperating therewith, both of which have a non-spring body, one of the elements being provided with a plurality of co-axial thread sections, the threads of each section being of uniform pitch throughout, the said sections immediately succeeding each other and being so arranged with respect to each other that the threads of said sections will be normally out of helical alinement, and the other element being provided with a continuous thread of a size and pitch uniform with the said thread sections and adapted to simultaneously engage the thread sections.

7. The combination of a threaded bolt and a nut coöperating therewith, both of which have a non-spring body, one of the elements being provided with a plurality of co-axial thread sections, the threads of each section being of uniform pitch throughout, the said sections immediately succeeding each other and being so arranged with respect to each other that the threads of said sections will be normally out of helical alinement, there being a non-threaded space between the proximate ends of the thread sections, and the other element being provided with a continuous thread of a size and pitch uniform with the said thread sections and adapted to simultaneously engage the thread sections.

8. The herein described lock nut having a solid non-spring threaded body, the thread being cut in such a manner as to form two co-axial sections of threads immediately succeeding each other and extending in directions from opposite faces of the nut toward each other, and so that the thread sections will be normally out of helical alinement, the threads of each section being of the same uniform pitch.

9. A nut or bolt lock element having a substantially unyielding body and provided with a plurality of threaded sections, the thread of each section being of uniform pitch throughout, the sections having like pitch of thread, and the thread in one section being displaced relatively to the thread in the other section in a direction along the axis of the nut or bolt element, to the extent that the threaded sections are out of helical alinement with respect to each other.

10. A nut or bolt lock element having a substantially unyielding body and provided with a plurality of threaded sections, the thread of each section being of uniform pitch throughout, the sections having like pitch of thread, and the thread in one section being displaced relatively to the thread in the other section in a direction along the axis of the nut or bolt element, to render the threaded sections out of helical alinement with respect to each other, said sections contiguous to each other.

11. The herein described threaded nut or bolt lock element, having a thread of uniform pitch throughout, said thread being arranged in sections which are bodily immovable with respect to each other, and said sections being slightly displaced one relatively to the other in the direction of the axis of the element.

12. The herein described nut and bolt lock element having a non-spring body provided with a plurality of threaded sections, said sections immediately succeeding each other, the threads of all of said sections being of uniform pitch throughout and so arranged that the threads of the sections will be normally out of helical alinement with respect to each other.

13. The herein described nut and bolt lock element having a non-spring body provided with a plurality of threaded sections of uniform pitch throughout and arranged with one threaded section out of helical alinement with the adjacent section; said sections immediately succeeding each other.

14. A nut or bolt lock element having a pair of threaded sections, the threads throughout the entire nut being of the same character as to pitch, form and size, but one section being offset in an axial direction with respect to the other to the extent that its thread is out of helical alinement with the threads of the latter and the two sections being bodily immovable with respect to each other.

15. A nut or bolt lock element having two threaded sections succeeding each other, one section being bodily offset in an axial direction with respect to the other to the extent that its thread is out of helical alinement with the thread of the other and the two sections being bodily immovable with respect to each other.

16. The combination of nut and bolt members one of which has a uniform thread throughout while the other has two sections of thread succeeding each other, either of which will fit the thread on the first mentioned member but whose sections are displaced in an axial direction with respect to each other to the extent that the thread of one section is out of helical alinement with the thread of the other.

In testimony whereof I have signed my name to this specification, in the presence of two subscribing witnesses, on this 21st day of March A. D. 1913.

CLIFFORD P. MARYE.

Witnesses:
 FLORENCE E. SCHULTZ,
 JOSEPHINE HOLQUIST.